US008821036B2

(12) United States Patent
Shigehara

(10) Patent No.: US 8,821,036 B2
(45) Date of Patent: Sep. 2, 2014

(54) OPTICAL MODULE AND OPTICAL SYSTEM

(75) Inventor: Masakazu Shigehara, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 162 days.

(21) Appl. No.: 13/307,030

(22) Filed: Nov. 30, 2011

(65) Prior Publication Data

US 2012/0163757 A1    Jun. 28, 2012

(30) Foreign Application Priority Data

Dec. 3, 2010  (JP) ................................ P2010-270369

(51) Int. Cl.
*G02B 6/36* (2006.01)
(52) U.S. Cl.
USPC ..................... 385/89; 385/72; 385/78; 385/59
(58) Field of Classification Search
USPC .................. 385/53–56, 69, 71–73, 77, 78
See application file for complete search history.

(56) References Cited

U.S. PATENT DOCUMENTS

| 7,184,635 B2 | 2/2007 | Livingston |
| 7,416,347 B2 * | 8/2008 | Livingston et al. ............. 385/53 |
| 8,419,292 B2 * | 4/2013 | Seng ............................... 385/71 |
| 2004/0042733 A1 * | 3/2004 | Kang et al. ...................... 385/71 |
| 2006/0275007 A1 | 12/2006 | Livingston et al. |

FOREIGN PATENT DOCUMENTS

| JP | H9-325238 | 12/1997 |
| JP | H11-160542 | 6/1999 |
| JP | 2003-329887 | 11/2003 |
| JP | 2006-011254 | 1/2006 |
| JP | 2008-502007 | 1/2008 |
| JP | 2008-525845 | 7/2008 |

* cited by examiner

*Primary Examiner* — Ellen Kim
(74) *Attorney, Agent, or Firm* — Drinker Biddle & Reath LLP

(57) ABSTRACT

The present invention provides an optical module and an optical system that can form a two-way optical transmitting and receiving line with the same optical wiring configuration without using any special parts. The optical module includes a plurality of single-fiber optical adapters, a multi-fiber optical adapter, a plurality of single-fiber optical connectors mating with the respective single-fiber optical adapters, a multi-fiber optical connector mating with the multi-fiber optical adapter, and a plurality of optical fibers connecting the respective single-fiber optical connectors and the multi-fiber optical connector. Wiring of the optical fibers is configured to connect two single-fiber optical connectors inserted into adjacent single-fiber optical adapters and fiber holes in the upper tier and the lower tier in the same row of the multi-fiber optical connector.

7 Claims, 5 Drawing Sheets

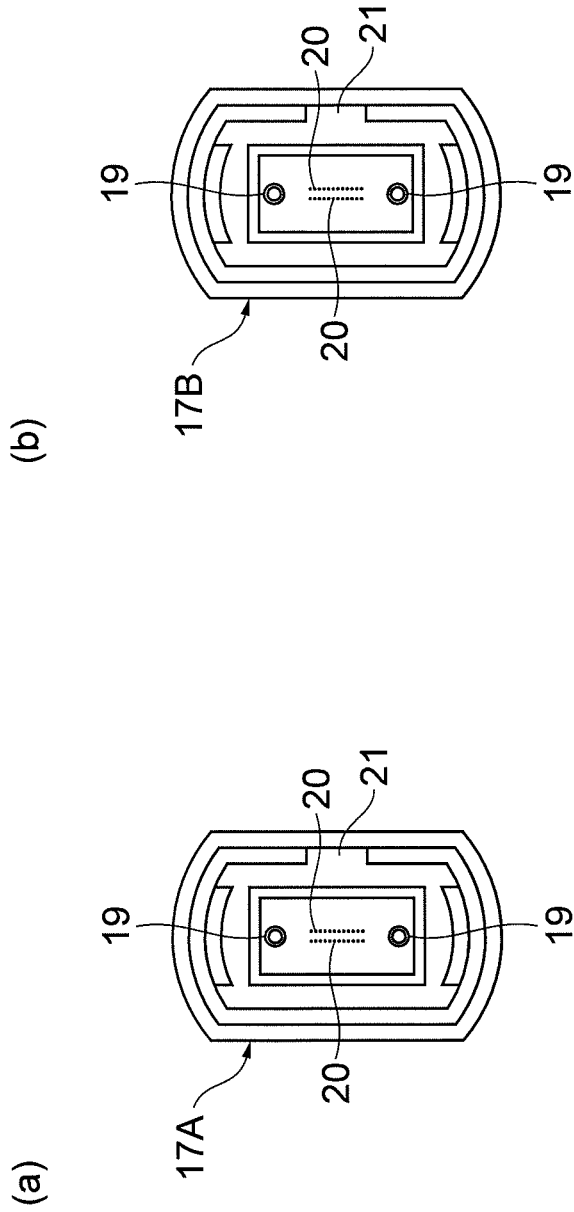

OPTICAL MODULE AND OPTICAL SYSTEM

BACKGROUND OF THE INVENTION

1. Field of the Invention

The present invention relates to an optical module and an optical system for making an optical connection using an optical connector.

2. Related Background Art

As a conventional optical system, one disclosed in Published Japanese Translation of PTC Application No. 2008-525845, for example, is known. The optical system disclosed in Published Japanese Translation of PTC Application No. 2008-525845 includes a module in which a multi-fiber connector and a plurality of single-fiber connectors are connected via optical fibers, a harness in which a multi-fiber connector and a plurality of single-fiber connectors are connected via optical fibers, and a trunk line (optical cable) that connects the module and the harness. In this optical system, the first single-fiber connector of the module is connected to the second single-fiber connector of the harness via the bottom (twelfth) optical fiber in the trunk line, and the second single-fiber connector of the module is connected to the first single-fiber connector of the harness via the top (first) optical fiber in the trunk line. Accordingly, it is possible to form a two-way optical transmitting and receiving line with the same optical wiring configuration on the module side and on the harness side.

SUMMARY OF THE INVENTION

However, in the above-described conventional technique, the following problem exists. Specifically, the optical fibers of an optical cable are inserted into a connector on one end of the cable in a standard order, but are inserted into a connector on the other end thereof in the reverse manner. In other words, the optical cable has a structure in which the optical fibers are cross wired. However, because such a cross-wired type optical cable is a special part, not a standard article, it is desirable not to use it.

An object of the present invention is to provide an optical module and an optical system that can form a two-way optical transmitting and receiving line in the same optical wiring configuration without using any special parts.

An optical module of the present invention includes a first optical adapter and a second optical adapter, a first optical connector mating with the first optical adapter, a second optical connector mating with the second optical adapter, and a plurality of optical fibers that connect the first optical connector and the second optical connector. The first optical connector has at least one first fiber hole into which one ends of the optical fibers are inserted, the second optical connector has a plurality of second fiber holes that are provided in a manner arranged in a plurality of tiers and into which the other ends of the optical fibers are inserted, and the optical fibers are configured to connect the first fiber holes forming a pair to the second fiber holes positioned in the tiers vertically symmetrical in a same row.

When constructing an optical system that has a two-way optical transmitting and receiving line by using such an optical module of the present invention, two pairs of the optical modules of the present invention are prepared and the optical modules are connected to each other by an optical cable. As the optical cable, a key-up key-down straight cable is used, to both ends of which third optical connectors each mating with the second optical adapter are provided. The third optical connectors have a plurality of third fiber holes that have an arrangement structure corresponding to the second fiber holes arranged in the tiers on the second optical connector. The key-up to key-down straight cable is a straight cable configured to have a key-up to key-down orientation in which the third optical connectors are vertically reverse to each other. In a state in which the respective third optical connectors of such an optical cable are inserted into the second optical adapters of two optical modules, wire connections of respective optical fibers of the optical cable with respect to the third fiber holes of the third optical connectors cross in the vertical direction. More specifically, one end of each optical fiber of the optical cable is connected to the third fiber hole in the upper tier of one of the third optical connectors, and the other end of each optical fiber of the optical cable is connected to the third fiber hole in the lower tier of the other of the third optical connectors. In addition, in each optical module, the first fiber holes forming the pair and the second fiber holes positioned in tiers that are vertically symmetrical in the same row are individually connected by the optical fibers.

Accordingly, in the above-described optical system, the first fiber hole corresponding to one (e.g., the transmitting side) of the corresponding pair in one of the optical modules is connected to the first fiber hole corresponding to one (e.g., the receiving side) of the corresponding pair of the other of the optical modules, via the optical fiber, the second fiber hole in the upper tier of the second optical connector, the third fiber hole in the upper tier of third optical connector, the optical fiber of the optical cable, the third fiber hole in the lower tier of the third optical connector, the second fiber hole in the lower tier of the second optical connector, and the optical fiber. In addition, the first fiber hole corresponding to the other (e.g., the receiving side) of the corresponding pair in one of the optical modules is connected to the first fiber hole corresponding to the other (e.g., the transmitting side) of the corresponding pair of the other of the optical modules, via the optical fiber, the second fiber hole in the lower tier of the second optical connector, the third fiber hole in the lower tier of third optical connector, the optical fiber of the optical cable, the third fiber hole in the upper tier of the third optical connector, the second fiber hole in the upper tier of the second optical connector, and the optical fiber. In this manner, by using two optical modules having exactly the same structure, and also using a key-up key-down straight cable that is a standard optical cable, it is possible to form a two-way optical transmitting and receiving line with the same optical wiring configuration in each of the optical modules even without using any special parts.

Preferably, the first optical adapter and the first optical connector are each provided in plurality, the first optical connector has the one first fiber hole, the second fiber holes are provided so as to be arranged in two, upper and lower tiers, and the optical fibers are configured to connect the first fiber holes of the first optical connectors forming the pair and the second fiber holes positioned in the upper tier and the lower tier in the same row. In this case, as the first optical connector, a single-fiber connector having one first fiber hole is used. In addition, as the second optical connector, a multi-fiber connector the respective second fiber holes of which have an arrangement structure of two, upper and lower tiers is used. Accordingly, it is possible to manufacture the optical module at low cost in a minimum necessary simple structure.

In addition, preferably, the second optical connector further has a pair of guide pins. When the optical module is accommodated in a case, for example, because it is difficult to open the optical module, it is necessary that the second optical connector arranged in the optical module will not be damaged. For that purpose, along with providing the pair of guide pins to the second optical connector, to the above-described third optical connector, a pair of guide holes mating with the guide pins is provided. Accordingly, when coupling the second optical connector and the third optical connector via the second optical adapter, the third optical connector may be easily damaged by the guide pins, but because the second optical connector has the guide pins, the second optical connector is less likely to be damaged.

An optical system of the present invention includes the above-described two optical modules and an optical cable connecting the two optical modules to each other. To both ends of the optical cable, third optical connectors each of which mates with the second optical adapter and has a plurality of third fiber holes having an arrangement structure corresponding to each of the second fiber holes are provided, and the optical cable is configured so that the third optical connectors have a key-up to key-down orientation to each other.

In this manner, the optical system of the present invention has the above-described two optical modules and the optical cable to both ends of which the above-described third optical connectors are provided, wherein the third optical connectors of the optical cable have a key-up to key-down orientation each other. Accordingly, as described above, it is possible to form a two-way optical transmitting and receiving line with the same optical wiring configuration in each of the optical modules even without using any special parts.

Preferably, the third optical connector further has a pair of guide holes mating with the respective guide pins. In this case, because the second optical connector has the guide pins as described above, when connecting the second optical connector and the third optical connector via the second optical adapter, the second optical connector is less likely to be damaged.

According to the present invention, without using any special parts, it is possible to form a two-way optical transmitting and receiving line in the same configuration. Accordingly, complicated management of the optical cables and the optical modules become unnecessary, whereby the optical system becomes easy to use.

BRIEF DESCRIPTION OF THE DRAWINGS

FIG. 5 is an A-A sectional view and a B-B sectional view of FIG. 3.

DESCRIPTION OF THE PREFERRED EMBODIMENTS

Preferred embodiments of an optical module and an optical system according to the present invention will be described hereinafter in detail with reference to the drawings.

Figure 1:
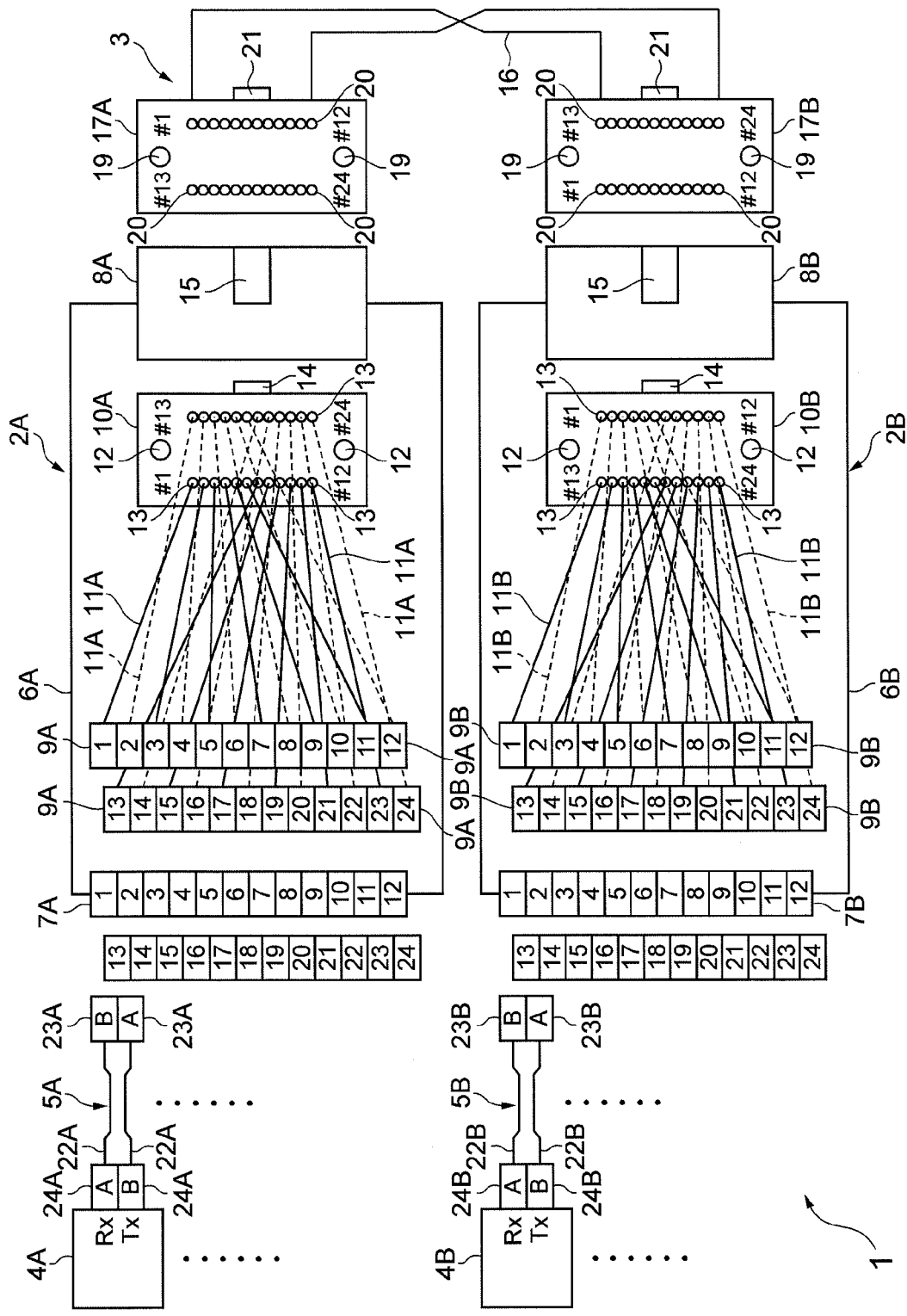
FIG. 1 is a schematic block diagram illustrating an optical system including one embodiment of an optical module according to the present invention.

FIG. 1 is a schematic block diagram illustrating an optical system including one embodiment of an optical module according to the present invention. In this diagram, this optical system 1 of the present embodiment includes optical modules 2A and 2B, an optical cable with connectors 3 that connects the optical modules 2A and 2B to each other, a plurality of optical transceivers 4A each having an optical transmitter Tx and an optical receiver Rx, a plurality of optical cables with connectors 5A that connect the optical transceivers 4A with the optical module 2A, a plurality of optical transceivers 4B each having an optical transmitter Tx and an optical receiver Rx, and a plurality of optical cables with connectors 5B that connect the optical transceivers 4B with the optical module 2B.

The optical module 2A has single-fiber optical adapters (first optical adapter) 7A in a plurality of rows (24 rows, herein) fixed on one end of a case 6A, a multi-fiber adapter (second optical adapter) 8A fixed on the other end of the case 6A, a plurality (24, herein) of single-fiber optical connectors (first optical connectors) 9A mating with the respective single-fiber optical adapters 7A, a multi-fiber optical connector (second optical connector) 10A mating with the multi-fiber optical adapter 8A, and a plurality (24, herein) of optical fibers 11A connecting each of the single-fiber optical connectors 9A and the multi-fiber optical connector 10A.

As the single-fiber optical connectors 9A, for example, SC connectors or LC connectors are used. Each of the single-fiber optical connector 9A has one fiber hole (first fiber hole) (not depicted) into which one end of each of the optical fibers 11A is inserted.

Figure 2:
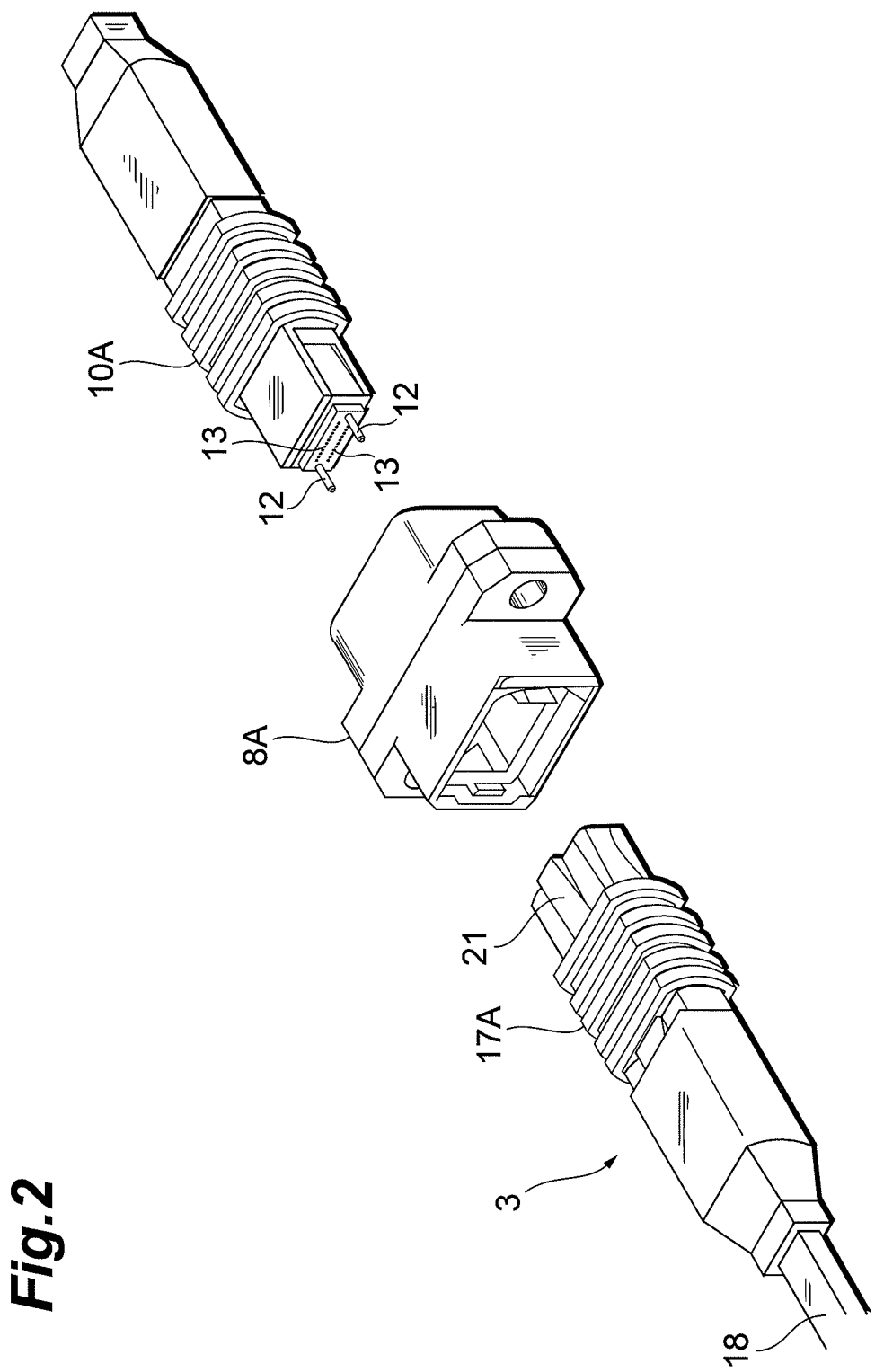
FIG. 2 is a perspective view illustrating the external appearance of multi-fiber optical connectors and a multi-fiber optical adapter depicted in FIG. 1.

As the multi-fiber optical connector 10A, an MPO connector as depicted in FIG. 2 is used. The multi-fiber optical connector 10A has a pair of guide pins 12 and a plurality (24, herein) of fiber holes (second fiber holes) 13 formed on areas between guide pins 12 and into which the other ends of the optical fibers 11A are inserted. These fiber holes 13 are arranged in two, upper and lower tiers with 12 rows each. To either upper or lower surface of the multi-fiber optical connector 10A, a key 14 in a projecting shape (see FIG. 1) is provided.

The multi-fiber optical connector 10A is inserted into one side of the multi-fiber optical adapter 8A. On inner walls of the multi-fiber optical adapter 8A, a pair of key-receiving grooves 15 (in FIG. 1, only one thereof is depicted in a simplified manner) that engage with a key 14 of the multi-fiber optical connector 10A and a key 21 of a multi-fiber optical connector 17A (described later) are provided. These key-receiving grooves 15 are formed in a vertically reverse manner at both sides of the multi-fiber optical adapter 8A. In other words, the multi-fiber optical adapter 8A is a key-up to key-down type straight adapter. The multi-fiber optical adapter 8A is fixed on the case 6A so that the key-receiving groove 15 on the outside of the case 6A is positioned above and the key-receiving groove 15 on the inside of the case 6A (not depicted) is positioned below. Accordingly, the multi-fiber optical connector 10A is inserted into the one side of the multi-fiber optical adapter 8A in such a manner that the surface on which the key 14 is provided faces downward.

Wiring of the optical fibers 11A is configured to connect two single-fiber optical connectors 9A inserted into adjacent single-fiber optical adapters 7A and fiber holes 13 in the upper tier and the lower tier in the same row of the multi-fiber optical connector 10A.

More specifically, the single-fiber optical connector 9A inserted into the leftmost single-fiber optical adapter 7A and the fiber hole 13 in the upper tier in the leftmost row (first row) of the multi-fiber optical connector 10A are connected by an optical fiber 11A, and the single-fiber optical connector 9A inserted into the second-from-leftmost single-fiber optical adapter 7A and the fiber hole 13 in the lower tier in the first row of the multi-fiber optical connector 10A are connected by an optical fiber 11A. In addition, the single-fiber optical connector 9A inserted into the third-from-leftmost single-fiber optical adapter 7A and the fiber hole 13 in the upper tier in the second-from-leftmost row (second row) of the multi-fiber optical connector 10A are connected by an optical fiber 11A, and the single-fiber optical connector 9A inserted into the fourth-from-leftmost single-fiber optical adapter 7A and the fiber hole 13 in the lower tier in the second row of the multi-fiber optical connector 10A are connected by an optical fiber 11A.

In other words, the single-fiber optical connector 9A inserted into the odd-numbered single-fiber optical adapter 7A from the leftmost end is serially connected to the fiber hole 13 in the upper tier of the multi-fiber optical connector 10A, and the single-fiber optical connector 9A inserted into the even-numbered single-fiber optical adapter 7A from the leftmost end is serially connected to the fiber hole 13 in the lower tier in the same row of the multi-fiber optical connector 10A.

The optical module 2B has single-fiber optical adapters (first optical adapter) 7B in a plurality of rows fixed on one end of a case 6B, a multi-fiber adapter (second optical adapter) 8B fixed on the other end of the case 6B, a plurality of single-fiber optical connectors (first optical connectors) 9B mating with the respective single-fiber optical adapters 7B, a multi-fiber optical connector (second optical connector) 10B mating with the multi-fiber optical adapter 8B, and a plurality of optical fibers 11B connecting each of the single-fiber optical connectors 9B and the multi-fiber optical connector 10B.

Structure of the single-fiber optical adapter 7B, the multi-fiber optical adapter 8B, the single-fiber optical connector 9B, and the multi-fiber optical connector 10B are the same as the structures of the single-fiber optical adapter 7A, the multi-fiber optical adapter 8A, the single-fiber optical connector 9A, and the multi-fiber optical connector 10A, respectively. In addition, a wiring configuration of the optical fibers 11B is the same as the wiring configuration of the optical fibers 11A described above. Therefore, the structure of the optical module 2B is exactly the same as the structure of the optical module 2A described above.

Figure 3:
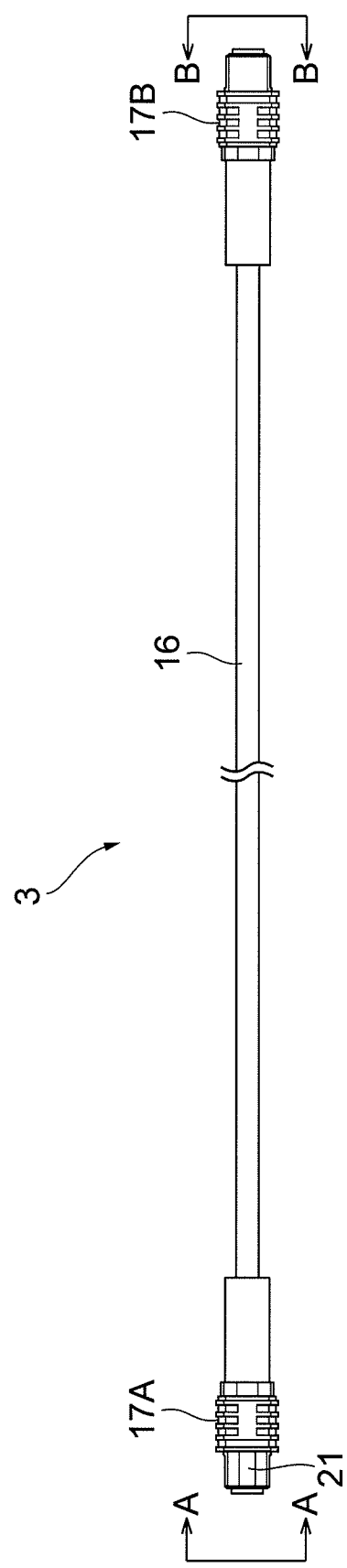
FIG. 3 is a plan view of an optical cable with connectors depicted in FIG. 1.

The optical cable with connectors 3, as depicted in FIG. 1 to FIG. 3, has a multi-fiber optical fiber cord 16 and multi-fiber optical connectors (third optical connectors) 17A and 17B that are individually attached to both ends of the multi-fiber optical fiber cord 16. The multi-fiber optical fiber cord 16 has a plurality (24, herein) of optical fibers.

The multi-fiber optical connector 17A mates with the multi-fiber optical adapter 8A so as to be connected to the multi-fiber optical connector 10A described above. As the multi-fiber optical connector 17A, an MPO connector (see FIG. 2) is used in the same way as in the case of the multi-fiber optical connector 10A. The multi-fiber optical connector 17A has a pair of guide holes 19 mating with the respective guide pins 12 of the multi-fiber optical connector 10A, and a plurality (24, herein) of fiber holes (third fiber holes) 20 formed on areas between guide holes 19 and into which one ends of the respective optical fibers of the multi-fiber optical fiber cord 16 are inserted. These fiber holes 20 are arranged in two, upper and lower tiers in 12 rows each in the same manner as the fiber holes 13 of the multi-fiber optical connector 10A. To either upper or lower surface of the multi-fiber optical connector 10A, the key 21 in a projecting shape is provided.

Figure 4:
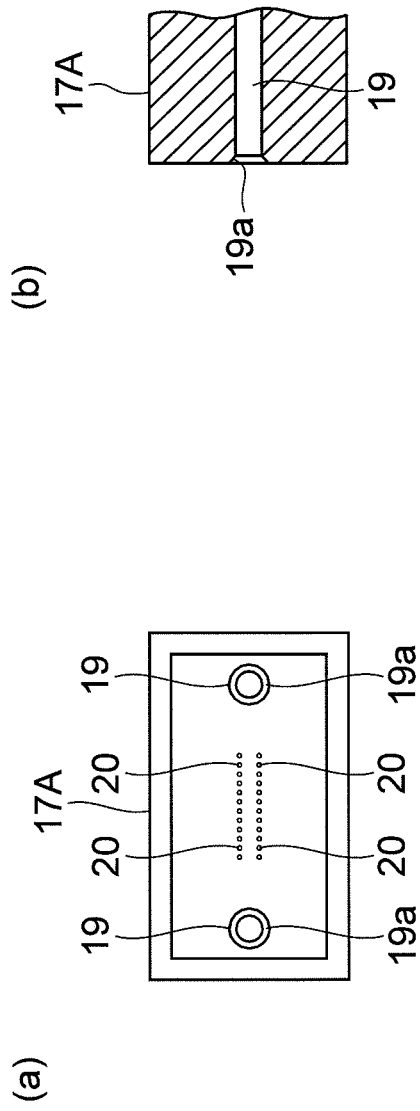
FIG. 4 is a front view and a cross-sectional view of main parts of a multi-fiber optical connector depicted in FIG. 3.

On the openings of the guide holes 19 in the multi-fiber optical connector 17A, as depicted in FIG. 4, chamfers 19$a$ are provided. Accordingly, when the guide pins 12 of the multi-fiber optical connector 10A are inserted into the guide holes 19, inlet portions of the guide holes 19 in the multi-fiber optical connector 17A are less likely to be damaged.

The multi-fiber optical connector 17B mates with the multi-fiber optical adapter 8B so as to be connected to the multi-fiber optical connector 10B described above. The multi-fiber optical connector 17B has the pair of guide holes 19, fiber holes 20, and the key 21 in the same manner as the multi-fiber optical connector 17A.

In a state in which this optical cable with connectors 3 is stretched straight, as depicted in FIG. 3 and FIG. 5, in such a manner that the positions of the keys 21 of the multi-fiber optical connectors 17A and 17B are vertically reverse to each other, the multi-fiber optical connectors 17A and 17B are attached to the multi-fiber optical fiber cord 16. In other words, the optical cable with connectors 3 has a key-up to key-down orientation in which the directions of the multi-fiber optical connectors 17A and 17B are vertically reversed, and constitutes a key-up to key-down type straight cable in which the multi-fiber optical connectors 17A and 17B are connected straight to each other by the multi-fiber optical fiber cord 16.

When inserting the multi-fiber optical connectors 17A and 17B of the optical cable with connectors 3 into the other sides of the multi-fiber optical adapters 8A and 8B of the optical modules 2A and 2B, respectively, from a state in which the optical cable with connectors 3 is stretched straight, the multi-fiber optical fiber cord 16 is bent approximately in a general U-shape so that the vertical directions of the respective keys 21 of the multi-fiber optical connectors 17A and 17B match each other. In other words, because the key-receiving grooves 15 of both of the multi-fiber optical adapters 8A and 8B are positioned in the upper sides, surfaces having the keys 21 are set facing upward in both of the multi-fiber optical connectors 17A and 17B.

In this case, when bending the multi-fiber optical fiber cord 16 approximately in a U-shape to insert the multi-fiber optical connectors 17A and 17B into the multi-fiber optical adapters 8A and 8B, respectively, the vertical positions of the respective optical fibers of the multi-fiber optical fiber cord 16 become opposite in the multi-fiber optical connector 17A and the multi-fiber optical connectors 17B. More specifically, a half of the optical fibers of the multi-fiber optical fiber cord 16 will be in a state of connecting the respective fiber holes 20 in the upper tier of the multi-fiber optical connector 17A with the respective fiber holes 20 in the lower tier of the multi-fiber optical connector 17B, and the remaining half of the optical fibers of the multi-fiber optical fiber cord 16 will be in a state of connecting the respective fiber holes 20 in the lower tier of the multi-fiber optical connector 17A with the respective fiber holes 20 in the upper tier of the multi-fiber optical connector 17B.

When the multi-fiber optical connectors 17A and 17B are inserted into the multi-fiber optical adapters 8A and 8B, respectively, the respective guide pins 12 of the multi-fiber optical connectors 10A and 10B are inserted into the respective guide holes 19 of the multi-fiber optical connectors 17A and 17B, respectively. In this case, because the optical modules 2A and 2B are accommodated in the cases 6A and 6B and it is difficult to take out the multi-fiber optical connectors 10A and 10B, it is necessary not to damage the multi-fiber optical connectors 10A and 10B. Herein, because the guide pins 12 are provided to the multi-fiber optical connectors 10A and 10B and the guide holes 19 are formed on the multi-fiber optical connectors 17A and 17B, it is possible to prevent damage of the multi-fiber optical connectors 10A and 10B caused by insertion of the guide pins.

Each of the optical cables with connectors 5A has two optical fibers 22A, two single-fiber optical connectors 23A attached to one ends of the respective optical fibers 22A, and two single-fiber optical connector 24A attached to the other ends of the respective optical fibers 22A. Each of the single-fiber optical connectors 23A mates with each of the single-fiber optical adapters 7A described above so as to be connected to each of the single-fiber optical connectors 9A described above. Each of the single-fiber optical connectors 24A is connected to the optical transmitter Tx and the optical receiver Rx of each of the optical transceivers 4A. The optical cables 5A with connectors are standard straight cables.

The optical transceivers 4B have the same structure as the optical transceivers 4A. Each of the optical cables with connectors 5B, in the same manner as the optical cables with connectors 5A described above, is a standard straight cable that has two optical fibers 22B, two single-fiber optical connectors 23B, and two single-fiber optical connectors 24B.

In the optical system 1 configured as described above, the single-fiber optical adapter 7A into which a single-fiber optical connector 23A of an optical cable with connectors 5A is inserted and the single-fiber optical adapter 7B into which a single-fiber optical connector 23B of an optical cable with connectors 5B is inserted are in the same position (row).

For example, respective single-fiber optical connectors 23A of an optical cable with connectors 5A are inserted into the leftmost (first) single-fiber optical adapters 7A and the second-from-leftmost (second) single-fiber optical adapter 7A, and respective single-fiber optical connectors 23B of an optical cable with connectors 5B are inserted into the respective first and second single-fiber optical adapters 7B in the same manner. In this case, the optical receiver Rx of an optical transceiver 4A is connected to the optical transmitter Tx of an optical transceiver 4B via the optical cable with connectors 5A, the first single-fiber optical connector 9A, an optical fiber 11A, the leftmost fiber hole 13 in the upper tier (first fiber hole) of the multi-fiber optical connector 10A, the first fiber hole 20 of the multi-fiber optical connector 17A, the multi-fiber optical fiber cord 16, the leftmost fiber hole 20 in the lower tier (first fiber hole) of the multi-fiber optical connector 17B, the first fiber hole 13 of the multi-fiber optical connector 10B, an optical fiber 11B, the second single-fiber optical connector 9B, and the optical cable with connectors 5B. On the other hand, the optical transmitter Tx of an optical transceiver 4A is connected to the optical receiver Rx of an optical transceiver 4B via the optical cable with connectors 5A, the second single-fiber optical connector 9A, an optical fiber 11A, the leftmost fiber hole 13 in the lower tier (thirteenth fiber hole) of the multi-fiber optical connector 10A, the thirteenth fiber hole 20 of the multi-fiber optical connector 17A, the multi-fiber optical fiber cord 16, the leftmost fiber hole 20 in the upper tier (thirteenth fiber hole) of the multi-fiber optical connector 17B, the thirteenth fiber hole 13 of the multi-fiber optical connector 10B, an optical fiber 11B, the first single-fiber optical connector 9B, and the optical cable with connectors 5B. Therefore, one pair of two-way transmitting and receiving lines is formed.

In the present embodiment described above, the optical module 2A configured by connecting mutually adjacent single-fiber optical connectors 9A with the fiber holes 13 in the upper tier and the lower tier in the same row of the multi-fiber optical connector 10A by the optical fibers 11A, and the optical module 2B having exactly the same structure as that of the optical module 2A, and the optical cable with connectors 3 configured by attaching the multi-fiber optical connectors 17A and 17B to both ends of the multi-fiber optical fiber cord 16 are prepared. Then, the multi-fiber optical connectors 17A and 17B of the optical cable with connectors 3 are connected to the multi-fiber optical connectors 10A and 10B via the multi-fiber optical adapters 8A and 8B of the optical modules 2A and 2B, respectively. Accordingly, by wire-connecting the optical cables with connectors 5A and 5B to the optical modules 2A and 2B, respectively in the same manner, a user can construct the optical system 1 having a plurality of sets of two-way transmitting and receiving lines.

In this case, because both of the optical cables with connectors 5A and 5B are the same standard straight cables, only one type thereof is adequate for an optical cable with connectors that connects the optical transceivers 4A and 4B with the optical modules 2A and 2B. In addition, because each of components constituting the optical module 2A and the optical wiring configuration of each of the single-fiber optical connectors 9A and the multi-fiber optical connector 10A are exactly the same as each of components constituting the optical module 2B and the optical wiring configuration of each of the single-fiber optical connectors 9B and the multi-fiber optical connector 10B, only one type thereof is adequate for an optical module. Therefore, it is not necessary to increase the types of parts used more than required.

In addition to the optical cables with connectors 5A and 5B being straight cables, the optical cable with connectors 3 connecting the optical modules 2A and 2B to each other is a key-up to key-down type straight cable. Furthermore, the multi-fiber optical adapters 8A and 8B that are components of the optical modules 2A and 2B are of the standard straight type. Accordingly, it is not necessary to use any special parts for the optical cable with connectors 3, the optical cables with connectors 5A or 5B, or the multi-fiber optical adapter 8A or 8B, and thus usability improves.

Because of the foregoing, it is possible to easily manage the optical modules 2A and 2B, the optical cable with connectors 3, and the optical cables with connectors 5A and 5B.

It should be noted that this invention is not limited to the above-described embodiments. For example, in the above-described embodiments, the odd-numbered single-fiber optical connectors 9A and 9B (hereinafter, referred to as the single-fiber optical connectors 9) and the fiber holes 13 in the upper tier of the multi-fiber optical connectors 10A and 10B (hereinafter, referred to as the multi-fiber optical connectors 10) are connected by the optical fibers 11A and 11B (hereinafter, referred to as the optical fibers 11) serially from the first row, and the even-numbered single-fiber optical connectors 9 and the fiber holes 13 in the lower tier of the multi-fiber optical connectors 10 by the optical fibers 11 serially from the first row, but the connection configuration of the optical fibers 11 is not particularly limited to this.

For example, it is acceptable to connect the odd-numbered single-fiber optical connectors 9 and the fiber holes 13 in the lower tier of the multi-fiber optical connectors 10 by the optical fibers 11, and to connect the even-numbered single-fiber optical connectors 9 and the fiber holes 13 in the upper tier of the multi-fiber optical connectors 10 by the optical fibers 11. It is also acceptable to connect the adjacent single-fiber optical connectors 9 and the fiber holes 13 in the upper tier and the lower tier in the same rows of the multi-fiber optical connectors 10 by the optical fibers 11, in a manner, for example, of connecting the first and second single-fiber optical connectors 9 and the fiber holes 13 in the upper and lower tiers in the second row of the multi-fiber optical connectors 10 by the optical fibers 11 and connecting the third and fourth single-fiber optical connectors 9 and the fiber holes 13 in the upper and lower tiers in the first row of the multi-fiber optical connectors 10 by the optical fibers 11.

In addition, in the above-described embodiments, the multi-fiber optical connectors 10 having a plurality of fiber holes 13 arranged in the two, upper and lower tiers are used, but the multi-fiber optical connectors 10 used is not particularly limited to such a two tier structure, and it is acceptable to use those having a plurality of fiber holes 13 arranged in three or more tiers. In this case, it goes without saying that, as the multi-fiber optical connectors 17A and 17B of the optical cable with connectors 3, those having fiber holes 20 that have the same arrangement structure as the fiber holes 13 are used.

More specifically, when using multi-fiber optical connector 10 having a plurality of fiber holes 13 arranged in the four tiers, for example, the first and second single-fiber optical connectors 9 and the fiber holes 13 in the top tier (first tier) and the bottom tier (fourth tier) in the same rows of the multi-fiber optical connectors 10 are connected by the optical fibers 11, and the third and fourth single-fiber optical connectors 9 and the fiber holes 13 in the second and third tiers in the same rows of the multi-fiber optical connectors 10 are connected by the optical fibers 11. Alternatively, when using multi-fiber optical connector 10 having a plurality of fiber holes 13 arranged in the six tiers, the first and second single-fiber optical connectors 9 and the fiber holes 13 in the top tier (first tier) and the bottom tier (sixth tier) in the same rows of the multi-fiber optical connectors 10 are connected by the optical fibers 11, the third and fourth single-fiber optical connectors 9 and the fiber holes 13 in the second and fifth tiers in the same rows of the multi-fiber optical connectors 10 are connected by the optical fibers 11, and the fifth and sixth single-fiber optical connectors 9 and the fiber holes 13 in the third and fourth tiers in the same rows of the multi-fiber optical connectors 10 are connected by the optical fibers 11. The point is that adjacent two single-fiber optical connectors 9 and two fiber holes 13 positioned in the tiers vertically symmetrical in the same rows of the multi-fiber optical connectors 10 are connected by the optical fibers 11.

Furthermore, in the above-described embodiments, adjacent two single-fiber optical connectors 9 and fiber holes 13 in the upper tier and the lower tier of the multi-fiber optical connectors 10 are connected by the optical fibers 11, but it is acceptable to use multi-fiber optical connectors instead of such single-fiber optical connectors 9. As the multi-fiber optical connectors for this case, it is acceptable to use those having a plurality of fiber holes in one line, or those having a plurality of fiber holes in a plurality of tiers. In this case, two fiber holes forming a pair in the multi-fiber optical connectors and fiber holes 13 in the upper tier and the lower tier of the multi-fiber optical connectors 10 are connected by the optical fibers 11.

In addition, in the above-described embodiments, the guide pins 12 are provided to the multi-fiber optical connectors 10A and 10B of the optical modules 2A and 2B, and the guide holes 19 are formed on the multi-fiber optical connectors 17A and 17B of the optical cable with connectors 3, but in the case that the multi-fiber optical connectors 10A and 10B are configured in such a structure that they can easily be taken out, for example, it is acceptable to provide guide pins to the multi-fiber optical connectors of the optical cable with connectors 3 and to form guide holes on the multi-fiber optical connectors of the optical modules 2A and 2B.

What is claimed is:

1. An optical module comprising:
a first optical adapter and a second optical adapter;
a first optical connector mating with the first optical adapter;
a second optical connector mating with the second optical adapter; and
a plurality of optical fibers that connect the first optical connector and the second optical connector, wherein
the first optical connector has a plurality of first fiber holes into which one end of the optical fibers are inserted,
the second optical connector has a plurality of second fiber holes into which the other end of the optical fibers are inserted,
the plurality of first fiber holes is arranged in at least a plurality of rows,
the plurality of second fiber holes is arranged in a plurality of rows and tiers, and has an arrangement identical to or an arrangement different from that of the plurality of first fiber holes, and,
a pair of optical fibers connects a pair of first fiber holes adjacent to each other in a row with a pair of second fiber holes of a same row positioned in vertically symmetrical tiers.

2. The optical module according to claim 1, wherein
the first optical adapter includes a plurality of single-fiber optical adapters,
the first optical connector includes a plurality of single-fiber optical connectors,
each of the single-fiber optical connectors has one first fiber hole,
the second fiber holes are provided so as to be arranged in two, upper and lower tiers, and
the pair of optical fibers connects the first fiber holes of a pair of single-fiber optical connectors adjacent to each other in a row with a pair of second fiber holes of the same row positioned in the upper tier and the lower tier.

3. The optical module according to claim 1, wherein the second optical connector further comprises a pair of guide pins.

4. An optical system comprising:
two optical modules that include a first optical adapter and a second optical adapter, a first optical connector mating with the first optical adapter, a second optical connector mating with the second optical adapter, and a plurality of optical fibers that connect the first optical connector and the second optical connector, wherein the first optical connector has a plurality of first fiber holes into which one end of the optical fibers are inserted, the second optical connector has a plurality of second fiber holes into which the other end of the optical fibers are inserted, the plurality of first fiber holes is arranged in at least a plurality of rows, the plurality of second fiber holes is arranged in a plurality of rows and tiers, and has an arrangement identical to arrangement different from that of the plurality of first fiber holes, and a pair of optical fibers connects a pair of first fiber holes adjacent to each other in a row with a pair of second fiber holes of a same row positioned in vertically symmetrical tiers; and
an optical cable connecting the two optical modules to each other, wherein
to both ends of the optical cable, third optical connectors each of which mates with the second optical adapter and has a plurality of third fiber holes having an arrangement structure corresponding to each of the second fiber holes are provided, and
the optical cable is configured so that the third optical connectors have a key-up to key-down orientation to each other.

5. The optical system according to claim 4, wherein the first optical adapter includes a plurality of single-fiber optical adapters,
the first optical connector includes a plurality of single-fiber optical connectors,
each of the single-fiber optical connectors has one first fiber hole,
the second fiber holes are provided so as to be arranged in two, upper and lower tiers, and the pair of optical fibers connects the first fiber holes of a pair of single-fiber optical connectors adjacent to each other in a row with a pair of second fiber holes of a same row positioned in the upper tier and the lower tier.

6. The optical system according to claim 4, wherein the second optical connector further comprises a pair of guide pins.

7. The optical system according to claim 4, wherein the third optical connector further has a pair of guide holes mating with the respective guide pins.

* * * * *